Patented Feb. 12, 1929.

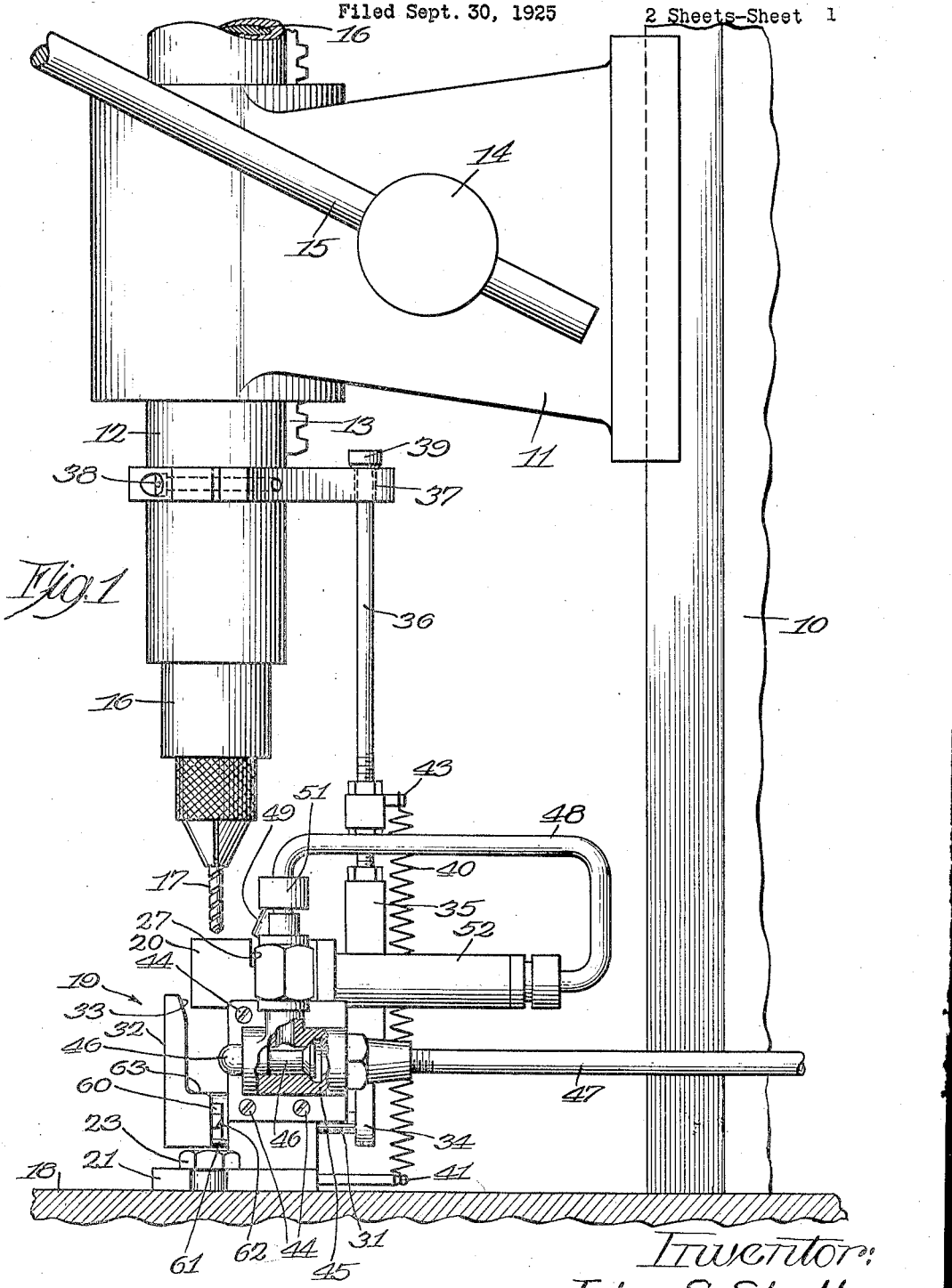

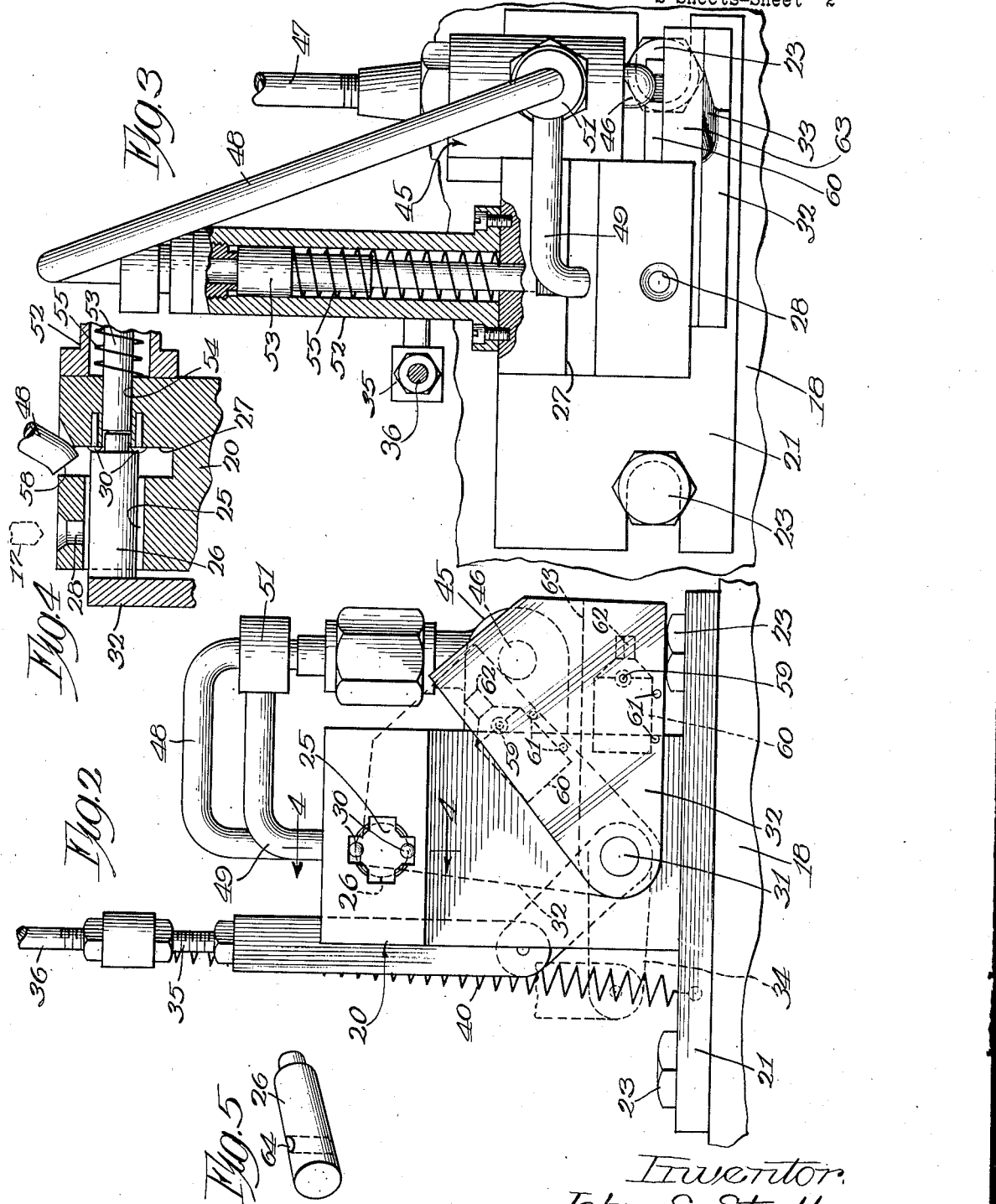

1,701,644

UNITED STATES PATENT OFFICE.

JOHN STANLEY STULL, OF CHICAGO, ILLINOIS, ASSIGNOR TO WESTERN ELECTRIC COMPANY, INCORPORATED, OF NEW YORK, N. Y., A CORPORATION OF NEW YORK.

WORK-HANDLING DEVICE FOR DRILLING MACHINES.

Application filed September 30, 1925. Serial No. 59,485.

This invention relates to work handling devices, and more particularly to work handling devices for use with drill presses.

The object of the invention is to provide a self-contained device which is attachable to and removable from the ordinary type of drill press as a unitary structure without necessitating any changes in or additions to the press itself and which operates simultaneously with working movements of the press to clamp a blank in a working position and eject the worked blank therefrom.

In accordance with one embodiment of the present invention, there is provided a self-contained device removably attachable to the bed of a drill press and having clamping means operating simultaneously with the advance of the drill spindle to clamp a blank in position while being drilled, and functioning upon the retraction of the spindle to cause the application of air to simultaneously remove the worked blank and material removed by the drill.

Other features and advantages of the invention will become more apparent from the following detailed description taken in connection with the accompanying drawings, in which Fig. 1 is a fragmentary side elevation of a drill press with a device embodying features of the invention operatively associated therewith;

Fig. 2 is an enlarged fragmentary front view thereof;

Fig. 3 is a fragmentary plan view thereof, partially in section;

Fig. 4 is a detail sectional view taken on the line 4—4 of Fig. 2 looking in the direction indicated by the arrows, and Fig. 5 is a perspective view of a blank after having work performed thereon by the press and associated device.

Referring to the drawings in which like reference characters designate like parts throughout the several views, the numeral 10 denotes the main frame of a drill press of a well known type (Fig. 1). Adjustably mounted on the frame 10 is an arm 11 having mounted thereon for reciprocal movement a drill spindle quill 12 having a rack bar 13 suitably secured to the periphery of the spindle and adapted to be engaged by a pinion (not shown) keyed to a shaft 14, the latter mounting a lever 15 at one end thereof for the purpose of rotating the pinion and thereby raising or lowering the spindle in a well known manner. Rotatably mounted in the drill spindle quill 12 and adapted to move therewith is a drill spindle 16 to which is suitably supported a drill 17, the spindle 16 receiving a rotary movement in any well known manner from a suitable source of power (not shown). A work bed integral with the frame of the press is indicated at 18 to which is removably secured a self-contained work holding device 19 embodying the features of this invention.

The device 19 comprises a body or frame 20 provided with a base plate 21 which is removably attached to the work bed 18 of the press by screw studs 23 threaded into the usual openings formed in the work bed of drill presses for securing work thereto. At the upper portion of the frame 20 is formed a circular aperture 25 for holding a blank 26 during the drilling thereof (Figs. 4 and 5) and formed at right angles to the length of the aperture 25 in the frame 20 is a slot 27 for the purpose of removing material removed by the drill during the drilling operation in a manner to be described hereinafter. The drill 17 in the operation of the press passes through an opening 28 formed in the top surface of the frame 20 and extending to the aperture 25, and into engagement with the blank 26 positioned in the aperture 25. A pair of stop pins 30 provided with conical heads are mounted in the right hand vertical wall of the slot 27 (Fig. 4) against which the blank is clamped in the operation of the device 19 to be described hereinafter, the pins serving to definitely position the blank relative to the drill 17 and also serving to prevent any foreign matter or material removed during the drilling operation from interfering with the proper positioning of the blank as will be readily apparent. Journaled in the frame 20 is a shaft 31, to one end of which is secured a blank holding or clamping plate 32 as clearly shown in Fig. 2, the plate being provided with a beveled edge 33 (Fig. 1) for engaging the blank inserted in the aperture 25 by an operative, and moving it into position against the stop pins 30 as clearly shown in Fig. 4. Suitably secured to the opposite end of the shaft 31 is an arm 34 which is pivotally connected to the lower bifurcated end of a link 35, with the lower end of a rod 36 adjustably mounted in the upper end thereof, as clearly indicated in Fig. 2. The upper end of the rod 36 is slidably mounted in a split collar 37 readily and removably clamped to the drill spindle quill 12 by screws 38 and is provided with an enlarged portion 39 which rests upon the upper surface of the collar 37 when the device is in its normal position as illustrated in Fig. 1. A coiled tension spring 40 secured at one end thereof to a pin 41 mounted in the frame 20 and at its opposite end to a pin 43 secured to the rod 36 serves to draw the rod 36 downwardly as the collar 37 moves with the drill spindle quill 12 upon the down stroke thereof. Upon completion of the drilling operation and during the retraction of the drill 17 from the blank 26, the blank and material removed by the drill during the drilling operation are removed from the device by the following means:

Mounted upon the frame 20 by screws 44 is an air valve 45 (Fig. 1) of any well known type employing a plunger 46 which is held in its closed position as shown in Fig. 1 by air under pressure entering the valve through a pipe 47 connected to a suitable source of supply (not shown). The plunger 46 upon actuation permits a blast of air to pass through the valve and into tubes 48 and 49 suitably connected to the valve as indicated at 51. The tube 48 is connected to one end of a cylinder 52 suitably secured to the frame 20, and within the cylinder is reciprocably mounted a shouldered plunger or piston 53 (Fig. 3), the cylinder and piston being disposed coaxially with the aperture 25 within which the blank is positioned and an aperture 54 formed in the frame 20 at the right hand side of the slot 27 as viewed in Fig. 4, a reduced end of the blank being entered in the latter aperture. A coiled compression spring 55 mounted around the piston 53 between the frame 20 and the cylinder 52 serves to move the piston to its retracted or normal position as shown in Fig. 3 after the ejection of the worked blank. The tube 49 is provided with a nozzle portion 58 which, as clearly shown in Fig. 4, is positioned adjacent the slot 27 for the purpose of ejecting material removed by the drill from the aperture 25 and slot 27 after the drilling operation. Freely pivoted upon the clamping plate 32 by a pin 59 is a plate 60 which in its normal position, as shown in Fig. 2, rests with its lower surface upon a pair of stop pins 61. The right hand end of the plate 60 as viewed in Fig. 2 engages the projecting end of the plunger 46 upon the counter clockwise movement of the plate 32 in response to the movement downward of the drill 17, but is turned about its pivot 59 in a clockwise direction due to such engagement without actuating the plunger 46 and immediately returns to its normal postion against the stop pins 61 due to the action of gravity as clearly shown in dotted outline in Fig. 2. Upon the return of the plate 32 to its normal position after the drilling operation a beveled edge 62 (Fig. 1) upon the right hand end of the plate 60 (Fig. 2) engages the end of the plunger 46, and due to the plate 60 resting upon the stop pins 61 is prevented from turning upon its pivot 59 in a counter clockwise direction, thereby resulting in the plunger 46 being actuated and as hereinbefore explained causing air under pressure to pass into the tubes 48 and 49 and to the cylinder 52 and slot 27 respectively.

The operation of the device hereinbefore described is as follows: With the parts in the position indicated in Figs. 1 and 2 an operative first inserts a blank 26 in the aperture 25 and in the manner hereinbefore described cause the drill spindle quill 12 and drill 17 to move downwardly by moving the lever 15 in a counter clockwise direction (Fig. 1). During the downward movement of the quill 12 the rod 36 will follow due to the spring 40 and cause the clamping plate 32 to be moved counter clockwise about its pivot (Fig. 2), the beveled edge 33 engaging the end of the blank 26 and clamping it against the stop pins 30. A shouldered surface 63 upon the plate 32 engages the frame 20 and forms a stop for the plate when it has reached its clamping position as indicated in dotted outline in Fig. 2. Immediately upon the plate 32 reaching the latter position the drill 17 enters the opening 28 and the continued downward movement of the quill 12 causes the rotating drill to engage the blank 26 and drill a hole 64 indicated in Fig. 5, the collar 37 sliding on the rod 36. An adjustable stop of any usual type (not shown) associated with the quill 12 above the arm 11 limits the downward movement of the drill 17. Upon the drill reaching the end of its downward movement, the operative moves the lever 15 upwardly which first retracts the drill 17 from the blank 26 and opening 25 and thereafter the top surface of the collar 37 engaging the underside of the enlarged portion 39 of rod 36 draws it upwardly against the action of the spring 40. The upward movement of the rod causes the clamping plate 32 to be moved clockwise to the position indicated in full lines (Fig. 2), and in being lowered to such position the beveled edge 62 upon the right hand end of the plate 60 (Fig. 1) engages the end of the plunger 46 of the valve 45 thereby actuating it and permitting a blast of air to simultaneously pass through the tubes 48 and 49 and thereby cause the piston 53 to eject the worked blank 26 from the aperture 25 and the removal of material formed by the drill during the drilling operation from the slot 27 and aperture 25. Upon the plate 60 passing the plunger 46 the spring pressed plunger returns to its normal position, thereby disconnecting the tubes 48 and 49 from the air supply and the piston 53 returns to its normal position due to the action of the spring 52 as hereinbefore set forth.

From the foregoing description it will be seen that the device described is self contained, being readily adaptable to the ordinary type of drill press without necessitating any material changes or additions thereto, the device being operated solely due to the reciprocal movement of the drill spindle quill to first automatically clamp the blank to be drilled and thereafter to cause the drilled blank and chips formed during the drilling operation to be ejected from the device.

What is claimed is:

1. The combination with a drill press comprising a drill spindle, a drill carried thereby, a work bed and means to move the spindle to and from the work bed, of a unitary device removably attachable to the work bed comprising a frame having a portion designed to hold a blank, an oscillating member mounted upon another portion of the frame designed to clamp the blank in a drilling position before the drill engages the blank during a movement of said member in one direction, a valve connected with a source of compressed air and actuated by said member during a movement thereof in another direction, a piston adjacent the blank adapted to eject the drilled blank from the device and operated by compressed air received through said valve, and a nozzle connected to said valve and arranged to direct a jet of air therefrom to remove the material removed during the drilling operation, said member operable during the movements of the spindle to and from the work bed.

2. The combination with a drill press comprising a drill spindle, a drill carried thereby, a work bed, and means for imparting a relative movement therebetween of a unitary device removably attachable to the work bed comprising a work holder, a pivoted member, means controlled by the spindle during the relative movement of the spindle and the work bed for swinging the member about the pivot thereof in one direction to directly engage a blank in the work holder to maintain it in a drilling position and to swing the member in the opposite direction, means for ejecting the drilled blank from the work holder, a nozzle positioned to direct compressed air to remove material removed from the blank during the drilling operation, a valve for controlling the admission of compressed air to operate the ejecting means and to the nozzle and having a portion projecting in the path of the member, means carried by the member for engaging the projecting portion during the movement of the member in each direction, and means also carried by the member for rendering the last mentioned means ineffective to operate the valve during the movement of the member to clamp the blank but permitting said means to operate the valve during the movement of the member in the other direction.

In witness whereof, I hereunto subscribe my name this 18th day of September, A. D. 1925.

JOHN STANLEY STULL.